United States Patent
Grant et al.

(10) Patent No.: US 9,251,283 B2
(45) Date of Patent: Feb. 2, 2016

(54) INSTRUMENTING A WEBSITE WITH DYNAMICALLY GENERATED CODE

(75) Inventors: Euan Grant, Redmond, WA (US); Brenden Riordan-Butterworth, Seattle, WA (US); Amit Fulay, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1305 days.

(21) Appl. No.: 12/270,975

(22) Filed: Nov. 14, 2008

(65) Prior Publication Data

US 2010/0125852 A1 May 20, 2010

(51) Int. Cl.
*G06F 17/30* (2006.01)
*G06F 9/54* (2006.01)
*G06F 11/34* (2006.01)

(52) U.S. Cl.
CPC ............ *G06F 17/3089* (2013.01); *G06F 9/541* (2013.01); *G06F 11/3466* (2013.01)

(58) Field of Classification Search
CPC ........................ G06F 17/3089; G06F 11/3466
See application file for complete search history.

(56) References Cited

U.S. PATENT DOCUMENTS

| | | | |
|---|---|---|---|
| 6,996,809 B2 | 2/2006 | Muhlestein et al. | |
| 7,103,874 B2 | 9/2006 | McCollum et al. | |
| 7,275,239 B2 | 9/2007 | Cuomo et al. | |
| 7,725,540 B2 * | 5/2010 | Roberts et al. | 709/205 |
| 7,949,563 B2 * | 5/2011 | Collins | 705/14.43 |
| 2002/0038368 A1 * | 3/2002 | Kojima et al. | 709/225 |
| 2005/0091364 A1 | 4/2005 | Bantz et al. | |
| 2005/0091647 A1 * | 4/2005 | McCollum et al. | 717/130 |
| 2007/0168998 A1 | 7/2007 | Mehta et al. | |
| 2008/0104224 A1 * | 5/2008 | Litofsky et al. | 709/224 |
| 2008/0140524 A1 * | 6/2008 | Anand et al. | 705/14 |
| 2009/0125544 A1 * | 5/2009 | Brindley | 707/102 |

OTHER PUBLICATIONS

Beginner's Guide to Network-Distributed Resource Usage, http://dast.nlanr.net/Guides/GettingStarted/GettingStartedGuide.pdf, Jun. 1, 2000.
JIT Instrumentation—A Novel Approach to Dynamically Insturment Operating Systems, http://www.cag.csail.mit.edu/~mareko/jifl-eurosys07.pdf, Mar. 2-3, 2007.
Tool Gear: Infrastructure for Building Parallel Programming Tools, https://e-reports-ext.llnl.gov/pdf/244115.pdf, Dec. 9, 2002.
Beginner's Guide to Network-Distributed Resource Usage, http://dast.nlanr.net/Guides/GettingStarted/GettingStartedGuide.pdf, Jun. 2000.

(Continued)

*Primary Examiner* — Charles E Anya
(74) *Attorney, Agent, or Firm* — Joann Dewey; Jim Ross; Micky Minhas

(57) ABSTRACT

A method, system, and medium are provided that relate to dynamically instrumenting a website. In general, an exemplary aspect of the invention includes storing configuration information in a datastore. A unique identifier, which corresponds to configuration information, is inserted within code of one or more web pages that relate to the website. When content is requested from the website, such as by a browser, the unique identifier can be used to retrieve corresponding configuration information. Using corresponding configuration information, instrumenting code may be generated and communicated, thereby instrumenting the website.

6 Claims, 10 Drawing Sheets

(56) References Cited

OTHER PUBLICATIONS

Dynamic Instrumentation of Production Systems, http://sun.com/bigadmin/content/dtrace_usenix.pdf, Jun. 2004.

JIT Instrumentation—A Novel Approach to Dynamically Insturment Operating Systems, http://www.cag.csail.mit.edu/~mareko/jifl-eurosys07.pdf, Mar. 2007.

Tool Gear: Infrastructure for Building Parallel Programming Tools, https://e-reports-ext.llnl.gov/pdf/244115.pdf, Dec. 2002.

Fine-Grained Dynamic Instrumentation of Commodity Operating System Kernels, http://www.usenix.org/publication/library/proceedings/osdi99/full_papers/tamches/tamches.pdf, Feb. 1999.

* cited by examiner

```
<!ANALYTICS -->
<script type="text/javascript"src="http://analytics.live.com/Analystics/msAnalytics.js"></script>
<script type+"text/javascript">
    msAnalytics.Profiled = 'C3C1';
    msAnalytics.TrackPage();
</script>
```
{ 510

FIG. 5

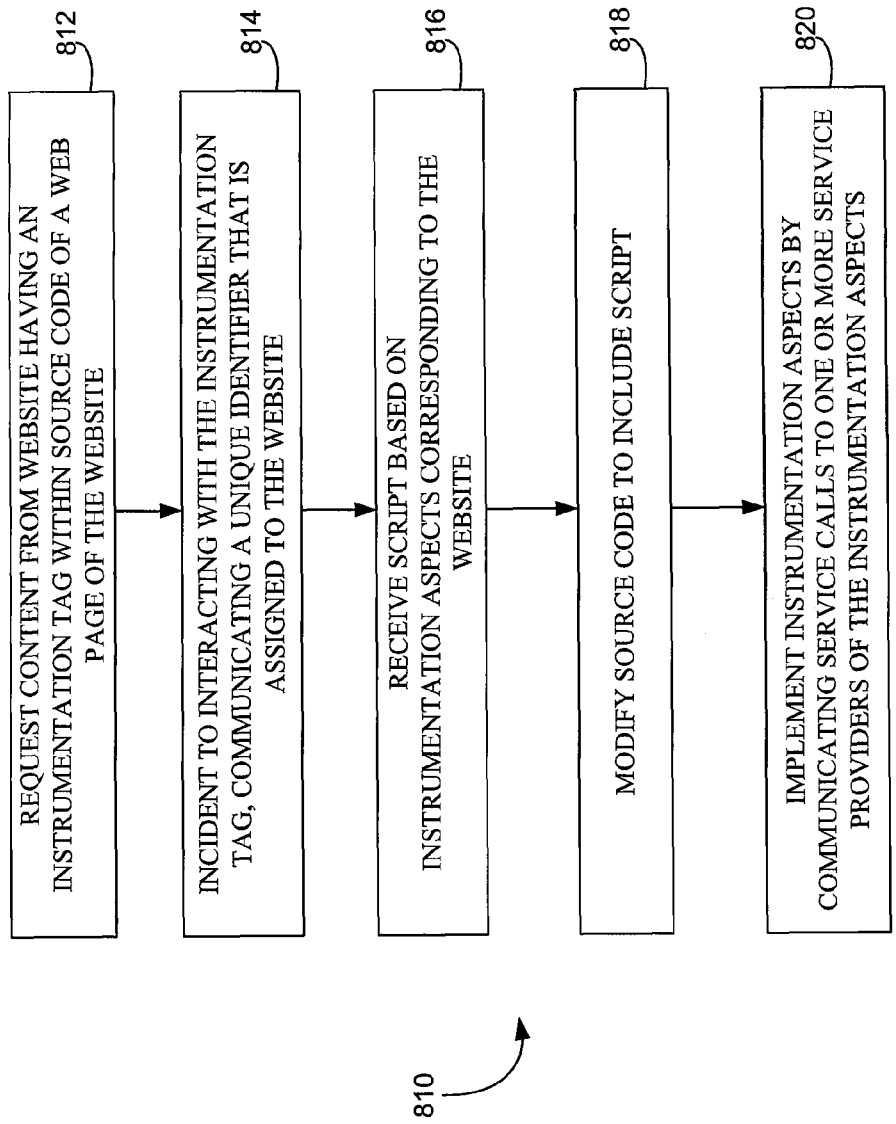

INSTRUMENTING A WEBSITE WITH DYNAMICALLY GENERATED CODE

BACKGROUND

Websites often utilize instrumentation services, which perform various functions in connection with website performance. Such services may be implemented by code instructions located within web pages of the website. Different services may be implemented using different code instructions. Whenever it is desired to change from one service to an alternative service, code instructions within the website may need to be replaced with different code instructions of the alternative service. Improperly modifying code instructions may result in poor website and instrumentation service performance.

SUMMARY

Embodiments of our technology are defined by the claims below, not this summary. A high-level overview of various aspects of the technology is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Our technology relates to instrumenting a website, such as by supplying a code statement for implementing information-gathering features. An example of such a code statement includes instrumentation code for enabling instrumentation services that are utilized by a website. Configuration information is stored in a datastore. Configuration information might include data relating to the website in addition to data relating to an instrumentation service utilized by the website. In response to a request for content of the website, the configuration information may be retrieved and utilized to generate instrumentation code. The instrumentation code may then be communicated to enable the instrumentation service utilized by the website.

BRIEF DESCRIPTION OF THE SEVERAL VIEWS OF THE DRAWINGS

Illustrative embodiments of our technology is described in detail below with reference to the attached drawing figures, which are incorporated by reference herein and wherein:

FIG. 5 depicts a block of code in accordance with an embodiment of our technology; and FIGS. 6-8 depict illustrative methods of instrumenting a website in accordance with embodiments of our technology.

DETAILED DESCRIPTION

Embodiments of our technology relate to systems and methods for instrumenting a website. In a general exemplary embodiment, configuration information is maintained in a datastore. A unique identifier, which corresponds to the configuration information, is inserted within code of one or more web pages that form a portion of the website. When content is requested from the website, such as by a browser, the unique identifier facilitates retrieval of configuration information needed to dynamically generate code. Service-implementing code is dynamically generated and communicated, thereby instrumenting the website in one embodiment. Some of the wording and form of description is done so herein to meet applicable statutory requirements. Although the terms "step" and/or "block" or "module" etc. might be used to connote different components of methods or systems employed, the terms should not be interpreted as implying any particular order among or between various steps unless and except when the order of individual steps is explicitly described.

Embodiments of our technology may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
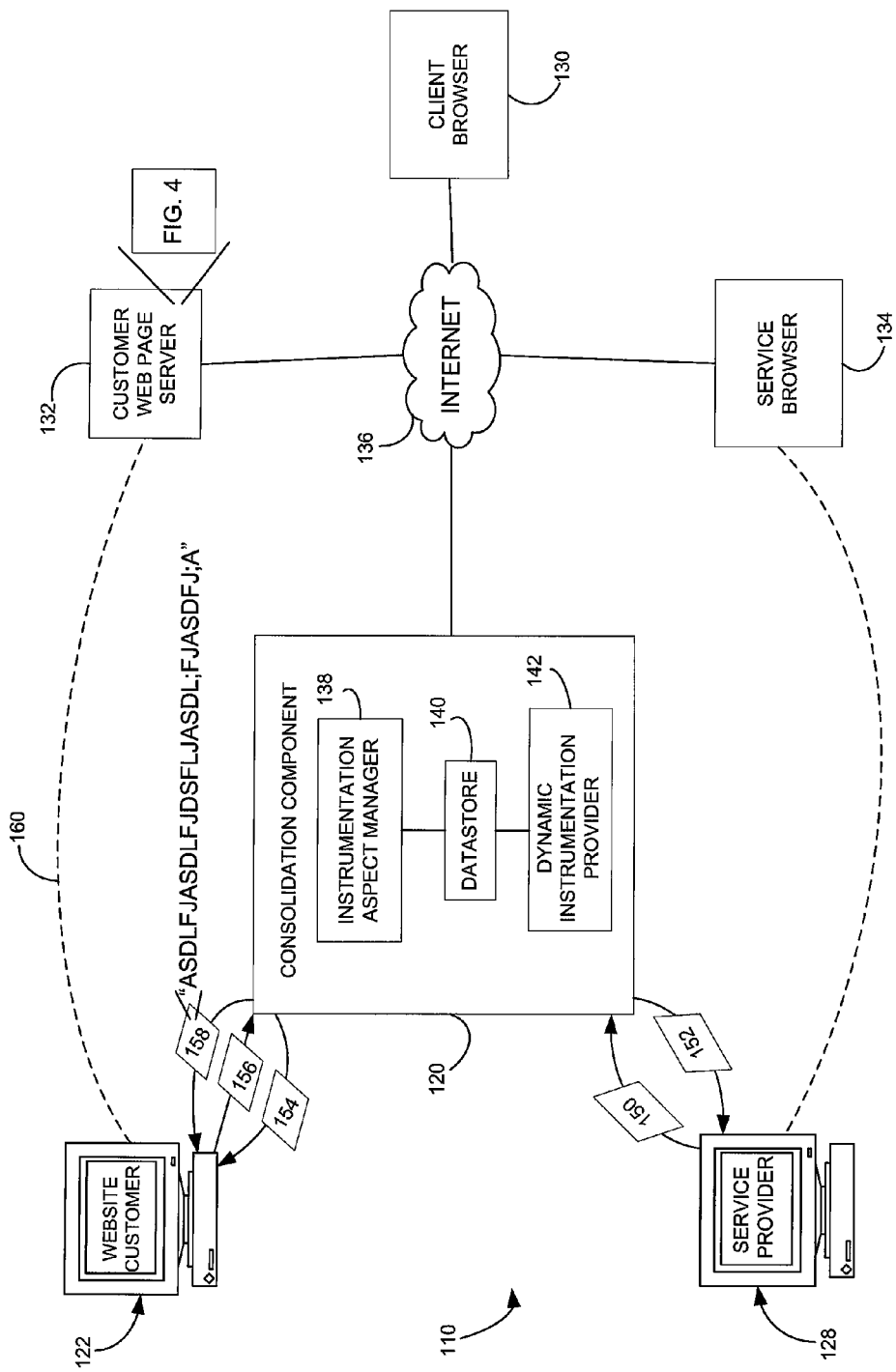
FIG. 1 depicts an illustrative operating environment suitable for practicing an embodiment of the technology.

With initial reference to FIG. 1, an illustrative operating environment suitable for practicing an embodiment of the technology is provided and referenced generally by the numeral 110. FIG. 1 shows a consolidation component 120 connected to a variety of other elements including a website customer 122, a service provider 128, a client browser 130, a customer webpage server 132, and a service browser 134. Consolidation component 120 includes subcomponents including an instrumentation aspect manager 138, a datastore 140 and a dynamic instrumentation provider 142. Consolidation component 120 may be a single computing device, which includes subcomponents, or may be a series of connected computing devices that perform functions of subcomponents 138, 140, and 142. Moreover, sub-components 138, 140, and 142 may each include one or more computing devices or may all comprise a single computing device.

Figure 2:
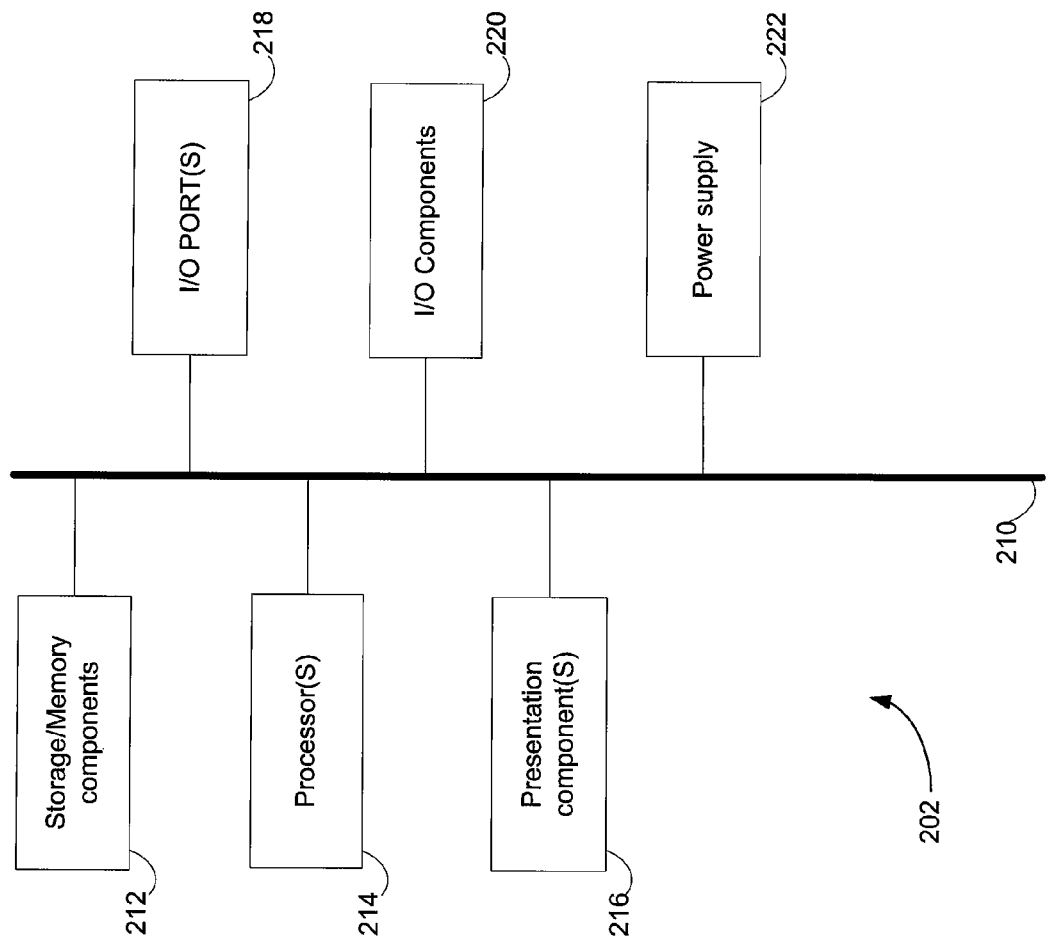
FIG. 2 depicts a block diagram illustrating certain components of an illustrative computing device suitable for practicing an embodiment of our technology.

Several components of the operating environment of FIG. 1, as well as other components of embodiments of the technology, might include one or more computing devices. Therefore, a general overview of an exemplary computing device will now be described in reference to FIG. 2. In FIG. 2, a diagrammatic block diagram of computing device 202 is provided, which device might take the form of a conventional computer as well as a consumer electronics device, such as an Internet-connected watch, mobile phone, and the like. Computing device 202 may take on a variety of forms, including, for example, a computing device such as a gaming console, a client computer, a server computer, variations thereof such as laptop computers and palm-top computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower level aspects of the shown devices are not shown so as to not obscure the technology.

Memory components 212 include things such as a hard drive, volatile memory (such as RAM), buffers, and the like. The one or more processors 214 control overall data communications throughout a computing device. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run computing device 202. Not all of the components shown in FIG. 2 need to be present in order to make up a computing device but are shown for illustrative purposes in connection with describing an embodiment of the technology.

Although the various blocks of FIG. 2 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of our technology.

Computing device 202 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; carrier wave; or any other medium that can be used to encode desired information and be accessed by computing device 202.

Returning now to FIG. 1, the operating environment shown is one in which a website is instrumented to enable services. As used herein the terms "instrument," "instrumenting," and "instrumented," describe supplying code, which may be placed at strategic locations within code. Accordingly, "instrumenting a website" describes supplying a website with code that may be strategically placed within code of the website. In exemplary embodiments, code supplied to a website is useful to facilitate operation of instrumentation services on a website. "Services" include applications that enable a variety of capabilities, such as instrumentation, and are performed by one or more service providers. As used herein, the phrase "instrumentation aspects" describes services that provide instrumentation capabilities. For example, instrumentation aspects include advertising services and/or analytics services. "Advertising services" perform a variety of functions including displaying advertisements on a web page and tracking performance of the advertisements. "Analytic services" perform a variety of functions including monitoring and analyzing traffic and other visitation metrics of a web page. Advertising services and analytic services are merely examples of services, and embodiments of our technology are broad enough to include instrumenting for other services as well.

In an aspect of the technology, consolidation component 120 registers instrumentation aspects of service provider 128. Registering includes receiving and storing information that is related to each instrumentation aspect of the service provider 128. Although we sometimes refer to certain items in the singular, we do not mean to imply that only one of such items is implicated. For example, "service provider" is used singularly for illustrative purposes in FIG. 1 and throughout this description; however, in reality the consolidation component 120 may register instrumentation aspects from multiple service providers. This concept is applicable to a great many items throughout this disclosure. Qualifying terms is persistently avoided so as to enhance readability of this description but not to substantively indicate singularity of items. Other examples illustratively include website customer 122, customer webpage server 132, client browser 130, service browser 134, instrumentation aspect manager 138, datastore 140, and dynamic instrumentation provider 142, all of which may include one or more of the respective component.

In an embodiment, registering instrumentation aspects includes receiving instrumentation details from service provider 128. The instrumentation details describe data that identifies and defines instrumentation aspects provided by service provider 128. Instrumentation details assist a computing device in executing a service. Instrumentation details include, for example, a name and description of a particular service (e.g., "XYZ Analytics for tracking website traffic"). Instrumentation details may include definitional, template-related, and schematic information necessary for a service to be properly implemented, e.g., entry points, data/function points for population, validation rules for APIs, etc.

Instrumentation details of various service providers include similar types of information; however, in the absence of standardization, the format and content of the information might vary to a great extent between service providers. Because switching from one instrumentation aspect to another might require modifying code based on corresponding instrumentation details, a lack of standardization can create opportunities for instrumenting error as there is more content to modify. In an exemplary embodiment, consolidation component 120 receives instrumentation details from service provider 128 by way of an instrumentation template, which describes a predefined format that can be populated with instrumentation details. Referring to FIG. 1, consolidation component 120 communicates to service provider 128 an instrumentation template 152. Consolidation component 120 may receive from service provider 128 instrumentation details 150 in a format consistent with the instrumentation template 152. In one embodiment, consolidation component 120 provides service provider 128 with an XML/XSD template. Consolidation component 120 receives instrumentation details 150 from service provider 128 by way of an XML/XSD template.

In one aspect of the technology, consolidation component 120 receives multiple sets of instrumentation details in a format consistent with instrumentation template 152. With consistently formatted instrumentation details, consolidation component 120 is enabled to more efficiently process updates across multiple sets of instrumentation details. Instrumentation template 152 creates a common set of concepts between service providers, as well as, a common method for exposing data and APIs. With common metadata, instrumentation details can be auto-filled with updated data.

In a further embodiment, consolidation component 120 includes an instrumentation aspect manager 138. Instrumentation aspect manager 138 serves as a subcomponent of consolidation component 120 and functions to interact with service provider 128 during registration of instrumentation aspects. For example instrumentation aspect manager 138 collects and stores instrumentation details 150. Instrumentation aspect manager 138 also provides centralized storage of instrumentation details of various instrumentation aspects.

Centralized storage facilitates efficient and standardized presentation of instrumentation aspects for selection by website customer 122.

In a further aspect of the technology, consolidation component 120 interacts with website customer 122 to facilitate selection of instrumentation aspects of service provider 128. Website customer 122 may adopt instrumentation aspects for use with a website of website customer 122. Examples of instrumentation aspects that website customer 122 may adopt include advertising services and analytics services. In an illustrative aspect, the website of website customer 122 is maintained on customer webpage server 132.

Consolidation component 120 presents registered instrumentation aspects 154 to website customer 122 for selection. In an embodiment, registered instrumentation aspects 154 are presented and selected through a user interface. The user interface allows website customers 122 to view registered instrumentation aspects 154 in a standardized format and to select registered instrumentation aspects 154 for application to a website. For example, website customer 122 might select an instrumentation aspect, which corresponds to instrumentation details 150.

In another embodiment, through the user interface, website customer 122 inputs, and consolidation component 120 receives, website customer parameters 156. Website customer parameters 156 are useful to generate code for enabling instrumentation aspects on a website of website customer 122. Examples of website customer parameters 156 include web site URL, web pages associated with the website, code blocks with unique identifiers within web pages, groupings of code blocks, identification of services selected, caching rules, and experimentation groups.

Once consolidation component 120 has received website customer parameters 156, including a selection of instrumentation aspects, in an exemplary embodiment consolidation component 120 groups together website customer parameters 156 and instrumentation details of instrumentation aspects selected by the website customer 122. For example, if website customer 122 selected an instrumentation aspect having instrumentation details 150, website customer parameters 156 would be grouped with instrumentation details 150.

In another aspect, consolidation component 120 assigns and communicates to website customer 122 one or more unique identifiers 158. Unique identifiers 158 might serve various functions including identifying a customer website and identifying a web page of the customer website. Unique identifiers might also identify customer parameters 156 and instrumentation details of instrumentation aspects selected by website customer 122. In other aspects, unique identifiers identify a location on a webpage. Moreover, unique identifiers might provide additional source necessary to generate code related to instrumentation aspects.

Figure 4A:
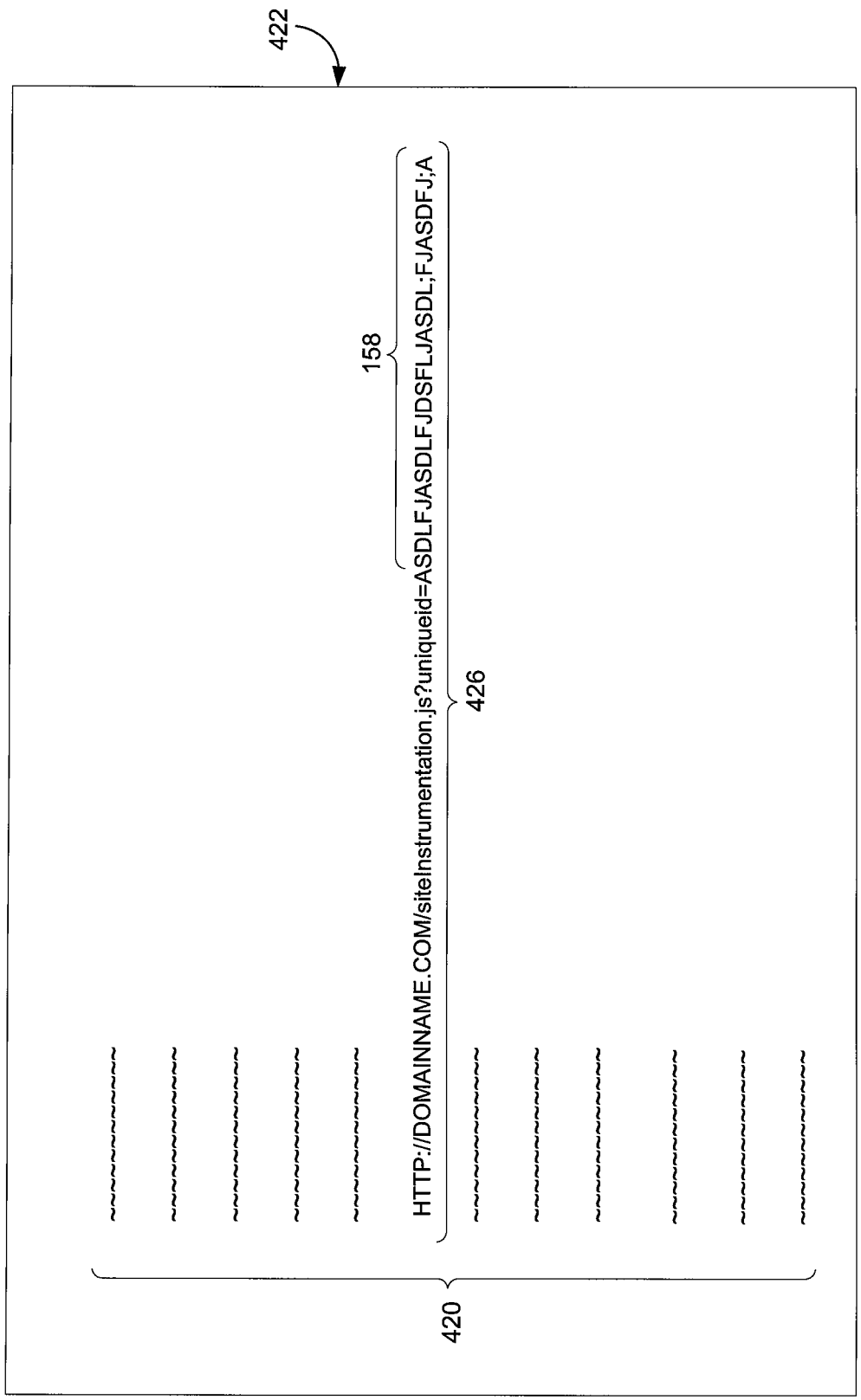
FIG. 4*a-c* depict an arrangement of source code of a web page in accordance with an embodiment of our technology.
Figure 4B:
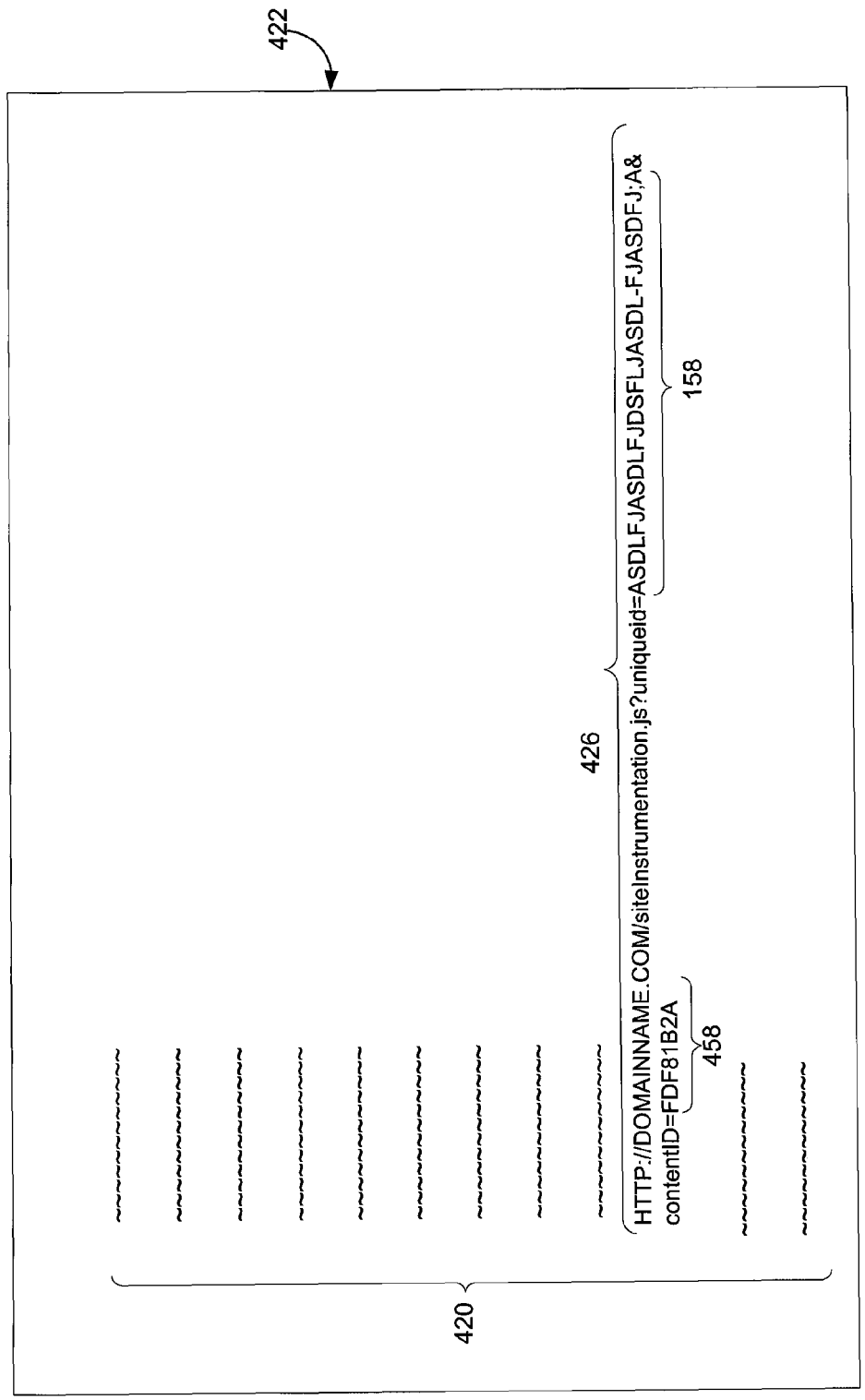
Figure 4C:
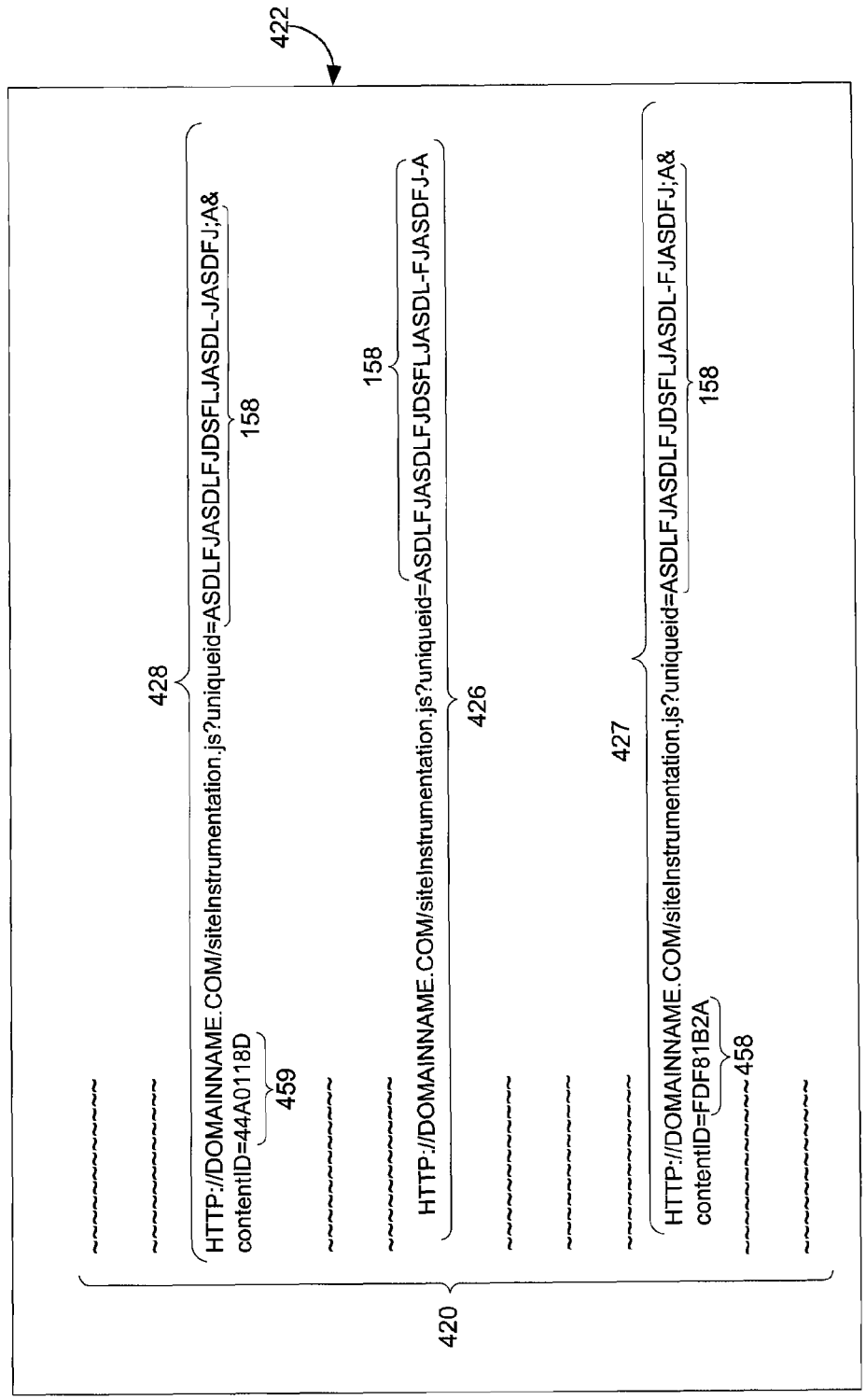

Both the quantity and content of the one or more unique identifiers assigned to website customer 122 might depend on instrumentation aspects selected. For example, if an instrumentation aspect, which applies uniformly across one or more web pages within a website, is selected, it might be appropriate to assign only one unique identifier for placement at a location within each of the one or more web pages. In such an embodiment the unique identifier might include a short string of text, which functions to identify the customer website and/or web pages and identify website customer parameters 156 and instrumentation details. An example of a single unique identifier is shown in FIG. 4a and identified by the numeral 158. Referring to FIG. 4b, a set of unique identifiers 158 and 458 might be assigned, wherein unique identifier 158 identifies the customer website and/or web pages and unique identifier 458 identifies website customer parameters and instrumentation details associated with the selected instrumentation aspect. Referring to FIG. 4c, in a further example, if several different instrumentation aspects are selected for placement at different locations within one web page, it might be appropriate to assign multiple unique identifiers 158, 458, and 459 for separate placement within the web page. In such an embodiment the multiple unique identifiers 158, 458, and 459 might each include a unique string of text for carrying out a different function. For example, unique identifier 158 might identify the customer website and/or webpage, unique identifier 458 might identify website customer parameters and instrumentation details pertaining to one instrumentation aspect (e.g., analytics), and unique identifier 459 might identify website customer parameters and instrumentation details pertaining to an alternative instrumentation aspect (e.g., advertising). Unique identifier 459 might also identify a location on the web page and provide additional information specific to static areas in the web page.

In one aspect of the technology, each website customer is assigned one or more unique identifiers that are distinct from all other unique identifiers assigned to other website customers. As previously described, consolidation component 120 includes an instrumentation aspect manager 138, which stores implementation details 150 for registered instrumentation aspects. In another aspect, instrumentation aspect manager 138 interacts with website customer 122 to facilitate selection of instrumentation aspects as described hereinabove.

In one embodiment of the technology, website customer parameters 156, instrumentation details 150 for selected instrumentation aspects, and one or more assigned unique identifiers 158 are stored in a manner that enables near simultaneous retrieval. Collectively, these categories of data comprise configuration information for website customer 122. "Configuration information" describes information necessary to generate instrumentation code. In one aspect, configuration information is stored in a datastore 140 of consolidation component 120. For example, datastore 140 might include a SQL database.

In order to retrieve configuration information and facilitate generation of instrumentation code, website customer 122 communicates one or more unique identifiers 158, which have been assigned to website customer 122, to consolidation component 120 in various ways. In exemplary embodiments, referring to FIGS. 4a-4c, unique identifiers 158, 458, and 459 are inserted within source code 420 of a web page 422 for which the website customer 122 has selected services. Unique identifiers 158, 458, and 459 include a string of text and are inserted within an instrumentation tag 426. Instrumentation tag 426 might be a URL, which, in an exemplary embodiment, includes an address for consolidation component 120. Instrumentation tag 426 is inserted within source code 420 of web page 422. Instrumentation tag 426 might replace instrumentation code for implementing a service. In embodiments in which the instrumentation tag 426 includes an address for the consolidation component 120, when a browser requests content of the web page 422, the instrumentation tag 426, and unique identifiers 158, 458, and 459 inserted therein, are communicated to consolidation component 120.

Web pages might be coded in a variety of ways to include one or more unique identifiers. In one embodiment, the manner in which a web page is coded depends on instrumentation aspects selected for application to the web page. For example, where a website customer has selected only general traffic-measuring analytics to evaluate each web page within a website, each web page might be coded once with the same unique identifier 158, such as shown in FIGS. 4a and 4b. In FIG. 4a, unique identifier 158 might identify both the customer website/web page and configuration information related to website customer 122, and unique identifier 158 might be coded into multiple web pages. In FIG. 4b, unique identifier 158 might identify the customer website/web page, and unique identifier 458 might identify configuration information. In another example, where a website customer has selected a variety of instrumentation aspects for application at different locations on a web page (e.g., banner ads and/or skyscraper ads), each unique identifier within a set of varying unique identifiers might be coded into different locations within the web page, as shown in FIG. 4c. In such an example, a unique identifier might only be coded into one web page to best facilitate a related instrumentation aspect. For example, if unique identifier 459 relates to advertising instrumentation for a banner ad, unique identifier 459 might only be coded into one specific location within web page 422. Upon receipt of unique identifier 459, consolidation component can retrieve related and necessary configuration information and dynamically generate browser-renderable code for specific placement on web page 422.

Figure 3:
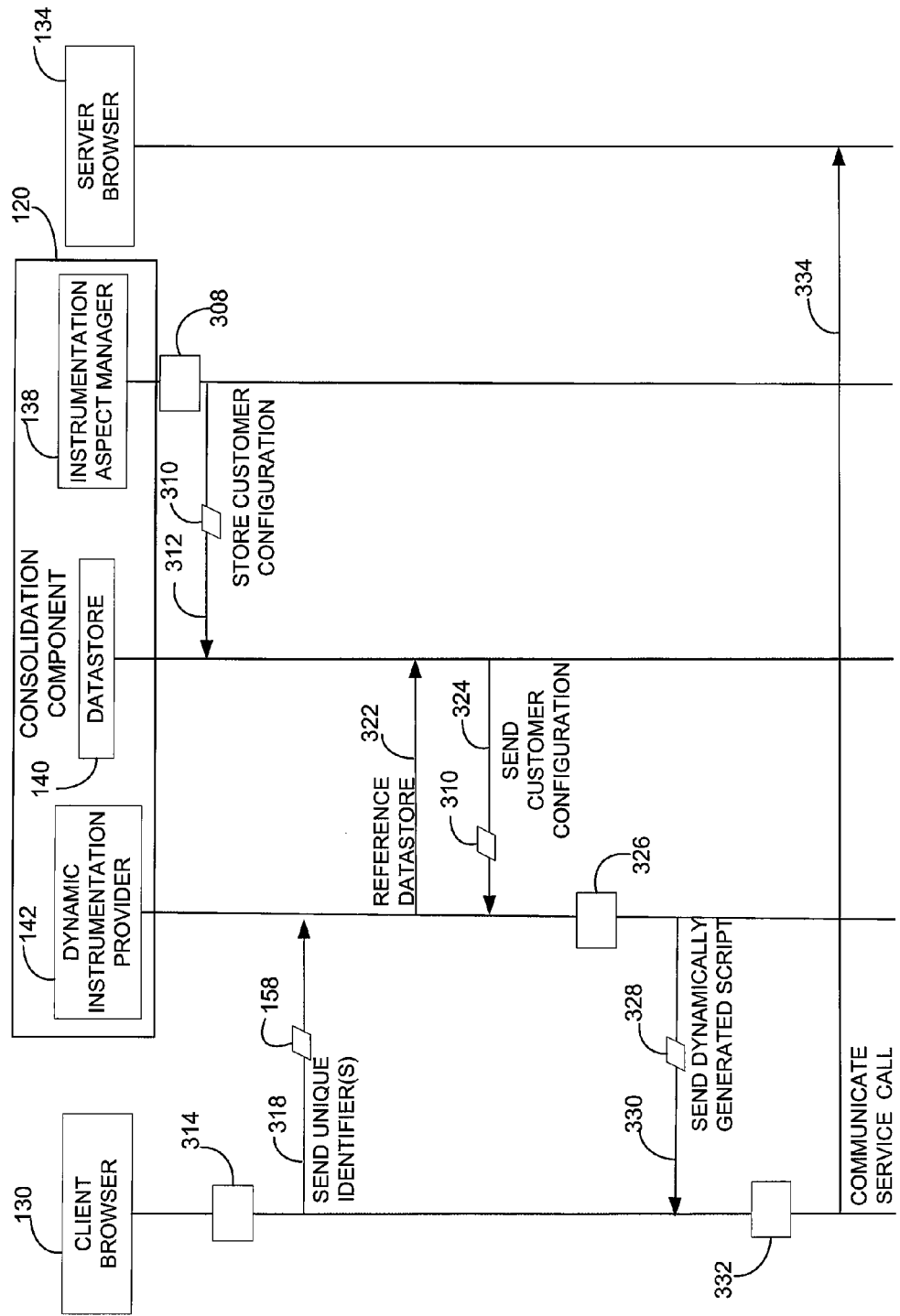
FIG. 3 depicts a flow chart illustrating exemplary actions and steps in accordance with an embodiment of our technology.

Referring to FIG. 1, in an operating environment for practicing the technology, consolidation component 120, client browser 130, customer webpage server 132, and service browser 134 are networked. In one embodiment, those components are networked by way of the Internet 136. In aspects of the technology, one or more unique identifiers 158 of website customer 122 are communicated to consolidation component 120 to retrieve configuration information of website customer 122 stored in the datastore 140. For example, referring to FIGS. 1 and 4, client browser 130 requests content from web page 422 of website customer 122 by communicating with customer web page server 132. Customer web page server 132 communicates data to client browser 130, such as source code 420 containing instrumentation tag 426. Because instrumentation tag 426 includes unique identifier 158 and an address for consolidation component 120, unique identifier 158 is communicated to consolidation component 120. Similar aspects of the technology, shown in FIG. 3, include client browser 130 requesting content from a web page server at step 314, and communicating unique identifier(s) 158 to consolidation component 120 at step 318.

In an exemplary embodiment, consolidation component 120 includes a dynamic instrumentation provider 142. Referring to FIG. 1, dynamic instrumentation provider 142 is connected to datastore 140 of consolidation component 120. Dynamic instrumentation provider 142 functions to receive unique identifier(s) 158, retrieve configuration information, and dynamically generate instrumentation code.

Returning to FIG. 3, after receiving the unique identifier(s) 158, at step 322 dynamic instrumentation provider 142 references datastore 140. Datastore 140 stores configuration information 310 that is identifiable by unique identifier(s) 158. When dynamic instrumentation provider 142 references datastore 140 using unique identifier(s) 158, datastore 140 communicates 324 configuration information 310 related to unique identifier(s) 158 to dynamic instrumentation provider 142.

Dynamic instrumentation provider 142 utilizes configuration information 310 to dynamically generate browser-renderable code at step 326. In another aspect, dynamic instrumentation provider might also use uniquely identified static code 458 to dynamically generate browser-renderable code 459. Where a set of static blocks of code are simultaneously received as a result of an interaction with one web page, dynamic instrumentation provider may dynamically generate multiple sets of dynamic instrumentation. "Browser-renderable code" describes blocks of code for enabling instrumentation aspects selected for a website. For example, browser-renderable code may include JavaScript Source, Static HTML/IFRAME Source, and/or Silverlight Assembly. FIG. 5 illustrates an example of a block of code 510. In aspects of the technology, information provided in instrumentation details 150 is leveraged to dynamically build code segments that reference appropriate resources of the service provider 128. In addition, configuration information is used to dynamically construct appropriate API calls to submit data. At step 330 of FIG. 3, dynamically generated code is communicated to client browser 130 by way of a script 328. Client browser 130, having received code for enabling services selected for the web page that was requested at step 314, renders the instrumentation, and appropriate service calls are communicated at step 334.

Figure 6:
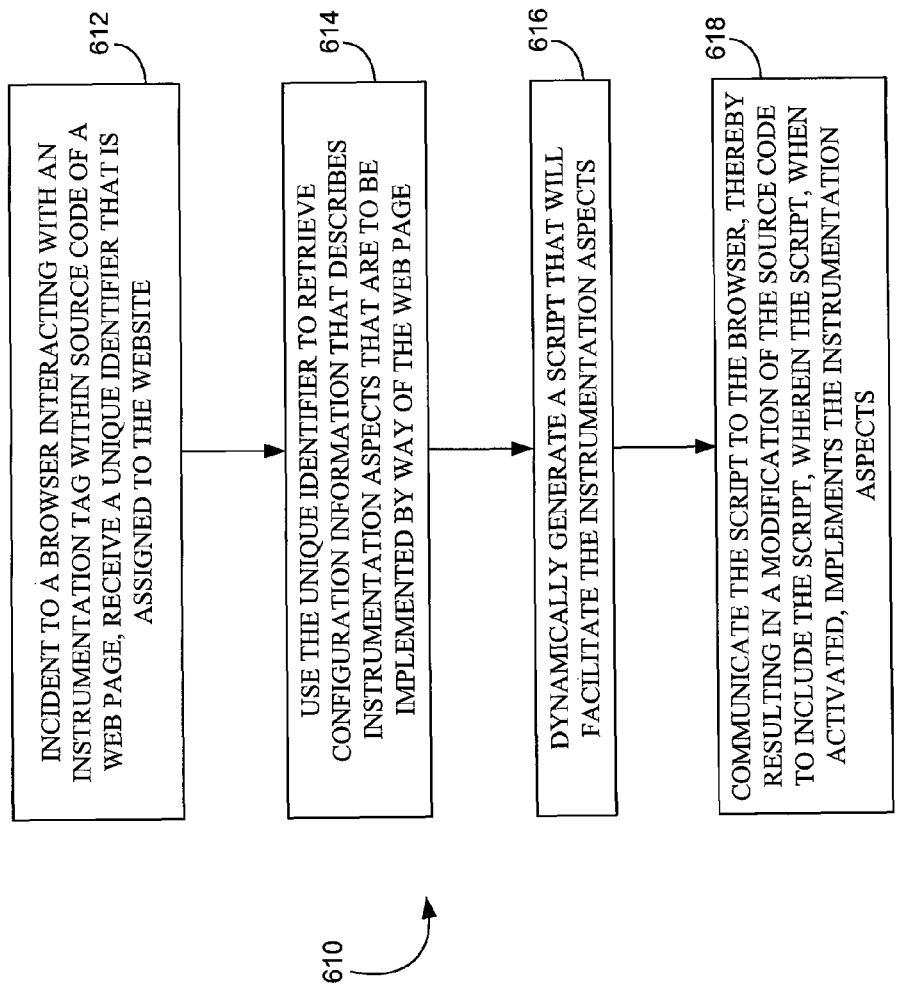

As shown in FIG. 6, in an exemplary embodiment, the technology comprises a method (indicated generally by numeral 610) of instrumenting a website. The method 610 includes at step 612, incident to a browser interacting with an instrumentation tag within source code of a web page, receiving a unique identifier that is assigned to the website. In addition, at step 614, the unique identifier is used to retrieve configuration information, which describes instrumentation aspects that are to be implemented by way of the web page, wherein the configuration information is stored in a datastore. At step 616 a script is dynamically generated that will facilitate the instrumentation aspects. Step 618 includes communicating the script to the browser, thereby resulting in a modification of the source code to include the script, wherein the script, when activated, implements the instrumentation aspects.

Figure 7:
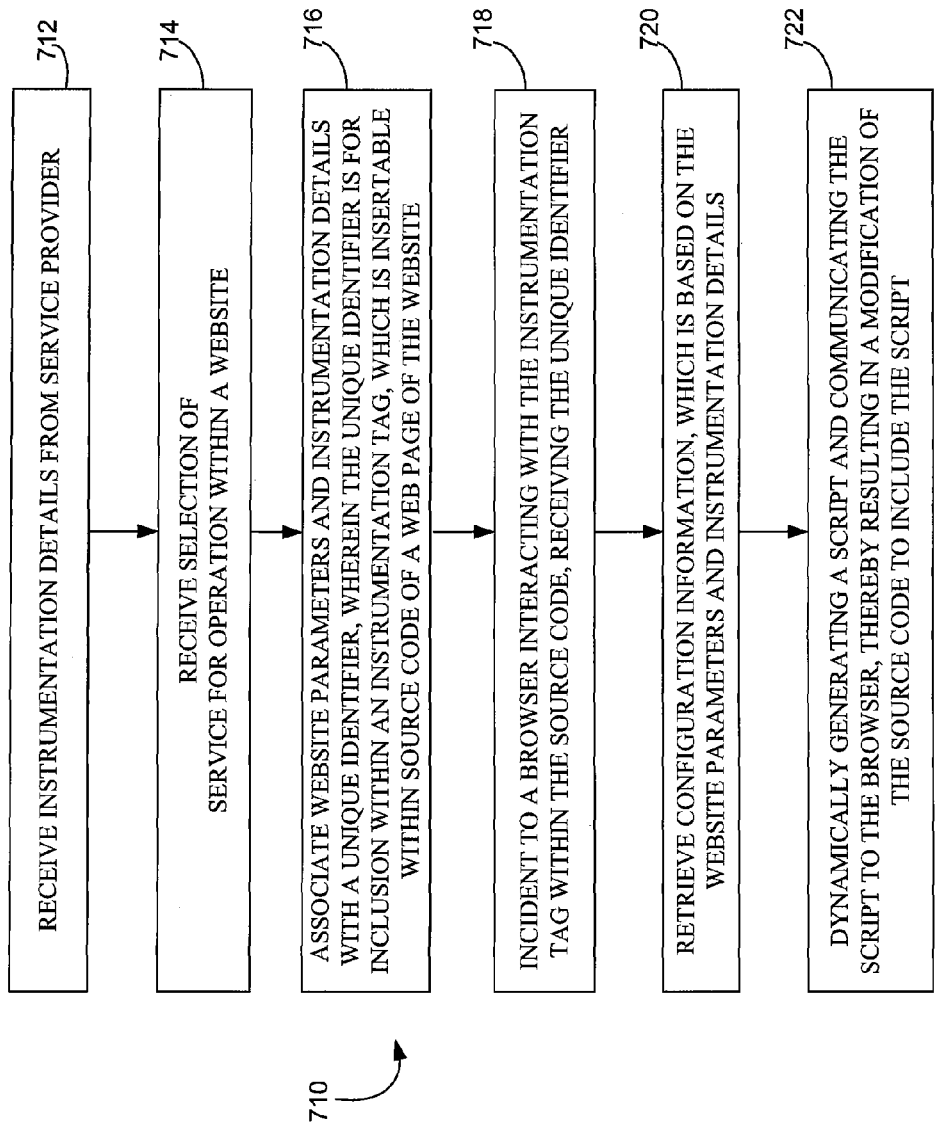

FIG. 7 illustrates another exemplary method (indicated generally by numeral 710) of instrumenting a website with a script for implementing a service of a service provider. The method 710 includes, at step 712, receiving instrumentation details from the service provider, wherein the instrumentation details define aspects of the service. In addition, at step 714 the method 710 includes receiving a selection of the service for operation within the website, wherein the website comprises website parameters. Step 716 includes associating the parameters and the instrumentation details with a unique identifier, wherein the unique identifier is for inclusion within an instrumentation tag, which is insertable within source code of a web page of the website. At step 718, incident to a browser interacting with the instrumentation tag within the source code, the unique identifier is received. Step 720 includes retrieving configuration information, which is based on the parameters and the instrumentation details. Finally, at step 722, the script is dynamically generated and communicated to the browser, thereby resulting in a modification of the source code to include the script, wherein the script, when activated, implements the service.

FIG. 8 illustrates another exemplary embodiment of our technology including a method (generally identified by numeral 810) for instrumenting a website with a script. In step 812 of the method, content is requested from the website having an instrumentation tag within source code of a web page of the website. Step 814 includes, incident to interacting with the instrumentation tag, communicating a unique identifier that is assigned to the website. In addition, step 816 includes receiving a script based on instrumentation aspects corresponding to the website, wherein the instrumentation aspects comprise one or more of analytic services and advertising services. Furthermore, at step 818 the source code of the web page is modified to include the script. Finally, step 820 includes implementing the instrumentation aspects by communicating service calls to one or more service providers of the instrumentation aspects.

In aspects of the technology, instrumentation tasks associated with adopting and changing services are largely removed from the responsibility of website customer 122 and are borne by the consolidation component 120. Website customer 122 interacts with the consolidation component 120 user interface to select or modify services for application to a website. In turn, the consolidation component 120 may create or update configuration information for the website customer. Upon receipt of unique identifier 158 for website customer 122, the consolidation component 120 is prepared to immediately dynamically-generate instrumentation code consistent with newly created or updated configuration information.

In other aspects of the technology, when service providers need to update instrumentation details, instead of updating each individual web page that utilizes corresponding services, the service provider only updates instrumentation details once through the consolidation component. In-turn, the consolidation component may update configuration information for generating instrumentation code.

In other embodiments, the consolidation component 120 facilitates a one-to-many instrumentation relationship. For example, website customer 122 only needs to strategically place the unique identifier to enable the consolidation component 120 to generate multiple blocks of code, which may initiate multiple service calls.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A non-carrier-wave computer memory device storing computer-executable instructions, that when executed by a computing device, perform operations for instrumenting a website with a script for implementing an ad-analytics service of a service provider, the computer-executable instructions comprising:

standardizing instrumentation code of a plurality of ad-analytics service providers by providing to the plurality of ad-analytics service providers a predefined instrumentation template, which is populatable with a respective set of instrumentation code of each service provider, wherein each set of instrumentation code, when executed, causes a respective ad-analytics service to be performed;

receiving a plurality of sets of instrumentation code from the plurality of ad-analytics service providers, wherein all sets of the plurality of sets of instrumentation code comprise a consistent standardized format based on the predefined instrumentation template, and wherein receiving the plurality of sets of instrumentation code having the consistent standardized format creates a common set of concepts and provides a method for exposing data and Application Programming Interfaces (APIs);

receiving webpage parameters of a webpage that has been selected to include at least one of the respective ad-analytics services, which is enabled by a respective set of instrumentation code;

storing the webpage parameters and the respective set of instrumentation code in association with a unique identifier, wherein the unique identifier is for inclusion within an instrumentation tag, which is embedded within source code of the webpage; and wherein the unique identifier enables retrieval of the webpage parameters and the respective set of instrumentation code from the datastore;

receiving from a browser, which executes the source code of the web page, the unique identifier that is assigned to the web page, wherein the unique identifier is embedded in an instrumentation tag within the source code of the web page;

retrieving the respective set of instrumentation code and the webpage website parameters; and dynamically generating the script and transmitting the script to the browser to supply ad-analytics service-rendering code, which performs the respective ad-analytics service when strategically inserted into the source code of the web page.

2. The computer memory device of claim 1,
wherein the standard predefined instrumentation template comprises an Extensible Markup Language (XML) based template.

3. The computer memory device of claim 1 wherein the website is selected to utilize the at least one of the respective services through a user interface, which renders the respective services of the plurality of service providers available to be selected for inclusion in the website.

4. The computer memory device of claim 1 further comprising, modifying the at least one of the respective services, wherein modifying comprises modifying the respective set of instrumentation details that is stored in association with the unique identifier by receiving modified instrumentation details submitted by way of the standard predefined instrumentation template, wherein the source code of the web page is not modified when modifying the at least one of the respective services.

5. A method of instrumenting a website with a script for implementing an ad-analytics service of a service provider, the method comprising:

providing a predefined template to a first ad-analytics service provider and to a second ad-analytics service provider, which is different than the first ad-analytics service provider, the first ad-analytics service provider and the second ad-analytics service provider being provided with a same predefined template;

receiving a first set of function points from the first ad-analytics service provider and a second set of function points from the second ad-analytics service provider, wherein the first set of function points and the second set of function points are received by entry into the predefined template, wherein the first set of function points and the second set of function points both include a consistent standardized format based on the predefined template, and wherein receiving first and second set of function points having the consistent standardized format a common set of concepts and provides a method for exposing data and Application Programming Interfaces (APIs);

receiving webpage parameters of a webpage that has been selected to include a first ad-analytics service provided by the first ad-analytics service provider and a second ad-analytics service from the second ad-analytics service provider;

assigning a unique identifier to the webpage that is to be included within an instrumentation tag embedded within source code of the webpage;

storing the webpage parameters, the first set of function points, and the second set of function points in association with the unique identifier, receiving from a browser, which executes the source code of the webpage, the unique identifier that is assigned to the webpage;

in response to receiving the unique identifier from the browser, retrieving the webpage parameters, the first set of function points, and the second set of function points;

dynamically generating the script by combining the webpage parameters of the webpage with the first set of function points and with the second set of function points; and transmitting the script to the browser to supply ad-analytics service-rendering code, which performs the first ad-analytics service provided by the first ad-analytics service provider and the second ad-analytics service provided by the second ad-analytics service provider.

6. A system for instrumenting a website with a script for implementing an ad-analytics service of a service provider, the system comprising:

a processor;

a memory;

a consolidation server that standardizes instrumentation code of a plurality of ad-analytics service providers by providing to the plurality of ad-analytics service providers a predefined instrumentation template, which is populatable with a respective set of instrumentation code of each service provider, wherein each set of instrumentation code, when executed, causes a respective ad-analytics service to be performed;

an instrumentation-manager module running on the consolidation server that receives a plurality of sets of instrumentation code from the plurality of ad-analytics service providers, wherein all sets of the plurality of sets of instrumentation code comprise a consistent standardized format based on the predefined instrumentation template, and wherein receiving the plurality of sets of instrumentation code having the consistent standardized format creates a common set of concepts and provides a method for exposing data and Application Programming Interfaces (APIs);

a datastore that stores the plurality of sets of instrumentation code;

a user-interface module rendered by the consolidation server that receives input of webpage parameters of a webpage that has been selected to include at least one of the respective ad-analytics services, which is enabled by a respective set of instrumentation code, the webpage parameters and the respective set of instrumentation code being stored in association with a unique identifier in the datastore, wherein the unique identifier is for inclusion within an instrumentation tag, which is embedded within source code of the webpage; and wherein the unique identifier enables retrieval of the webpage parameters and the respective set of instrumentation code from the datastore.

\* \* \* \* \*